United States Patent
Wang et al.

(10) Patent No.: US 9,258,070 B2
(45) Date of Patent: *Feb. 9, 2016

(54) SIMULTANEOUS FEEDBACK SIGNALING FOR DYNAMIC BANDWIDTH SELECTION

(75) Inventors: James June-Ming Wang, San Marino, CA (US); Vishakan Ponnampalam, San Jose, CA (US); Jianhan Liu, San Jose, CA (US); Chao-Chun Wang, Taipei (TW); Huanchun Ye, Cupertino, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 112 days.

This patent is subject to a terminal disclaimer.

(21) Appl. No.: 13/635,341

(22) PCT Filed: Oct. 20, 2011

(86) PCT No.: PCT/US2011/057041
§ 371 (c)(1),
(2), (4) Date: Sep. 14, 2012

(87) PCT Pub. No.: WO2012/054699
PCT Pub. Date: Apr. 26, 2012

(65) Prior Publication Data
US 2013/0010632 A1 Jan. 10, 2013

Related U.S. Application Data

(60) Provisional application No. 61/405,752, filed on Oct. 22, 2010, provisional application No. 61/406,294, filed on Oct. 25, 2010.

(51) Int. Cl.
*H04W 4/00* (2009.01)
*H04B 17/309* (2015.01)
*H04B 17/24* (2015.01)

(52) U.S. Cl.
CPC ............. *H04B 17/309* (2015.01); *H04B 17/24* (2015.01)

(58) Field of Classification Search
None
See application file for complete search history.

(56) References Cited

U.S. PATENT DOCUMENTS 8,073,489 B2 * 12/2011 Liu et al. ............... 455/561
8,462,863 B1 * 6/2013 Zhang et al. .......... 375/260

(Continued)

OTHER PUBLICATIONS

International Search Report and Written Opinion mailed Feb. 6, 2012.

(Continued)

*Primary Examiner* — Anh-Vu Ly
(74) *Attorney, Agent, or Firm* — McClure, Qualey & Rodack, LLP

(57) ABSTRACT

A method of simultaneously providing channel quality feedback information in all valid sub-channels is provided to facilitate and improve the performance of dynamic transmission bandwidth adjustment and fast link adaptation. A receiving device receives a sounding signal over a wide channel in a wireless system. The sounding signal is transmitted from a transmitting device over multiple sub-channels of the wide channel. The receiving device estimates channel quality information based on the sounding signal for each sub-channel. The channel quality information includes estimated average SNR and recommended MCS and other channel quality metrics. The receiving device transmits a feedback message to the transmitting device. The feedback message contains the estimated channel quality information for all valid sub-channels within the transmission bandwidth. The transmitting device performs dynamic transmission bandwidth selection and fast link adaptation based on the channel quality information for all valid sub-channels.

18 Claims, 5 Drawing Sheets

(56) References Cited

U.S. PATENT DOCUMENTS

| | | | |
|---|---|---|---|
| 2007/0177501 A1* | 8/2007 | Papasakellariou | 370/229 |
| 2008/0207135 A1* | 8/2008 | Varadarajan et al. | 455/69 |
| 2008/0219370 A1* | 9/2008 | Onggosanusi et al. | 375/260 |
| 2009/0116570 A1* | 5/2009 | Bala et al. | 375/260 |
| 2009/0154588 A1* | 6/2009 | Chen et al. | 375/267 |
| 2009/0163142 A1* | 6/2009 | Pi et al. | 455/62 |
| 2009/0225738 A1* | 9/2009 | Xu et al. | 370/343 |
| 2009/0225879 A1* | 9/2009 | Kloos et al. | 375/260 |
| 2009/0238241 A1* | 9/2009 | Hooli et al. | 375/133 |
| 2009/0245337 A1 | 10/2009 | Ramachandran et al. | |
| 2010/0208608 A1 | 8/2010 | Wang | |
| 2011/0176629 A1* | 7/2011 | Bayesteh et al. | 375/267 |
| 2011/0243208 A1* | 10/2011 | Shany et al. | 375/224 |
| 2011/0255620 A1* | 10/2011 | Jones et al. | 375/260 |
| 2011/0261708 A1* | 10/2011 | Grandhi | 370/252 |
| 2011/0261806 A1* | 10/2011 | Chun et al. | 370/342 |
| 2011/0310827 A1* | 12/2011 | Srinivasa et al. | 370/329 |
| 2012/0033592 A1* | 2/2012 | Kim et al. | 370/310 |
| 2012/0051246 A1* | 3/2012 | Zhang et al. | 370/252 |
| 2012/0057499 A1* | 3/2012 | Pedersen et al. | 370/252 |
| 2012/0076023 A1* | 3/2012 | Ko et al. | 370/252 |
| 2012/0155408 A1* | 6/2012 | Pedersen et al. | 370/329 |
| 2013/0058239 A1* | 3/2013 | Wang et al. | H04B 7/0417 370/252 |
| 2013/0336215 A1* | 12/2013 | Kim et al. | 370/328 |

OTHER PUBLICATIONS

Hiertz et al. The IEEE 802.11 Universe. IEEE Communications Magazine. [online], Jan. 2010 [retrieved on Jan. 19, 2012]. Retrieved from the Internet: <URL: http://titania.ctie.monash.edu/wireless-nets/hiertz2010.pdf>, p. 64, para 7.

* cited by examiner

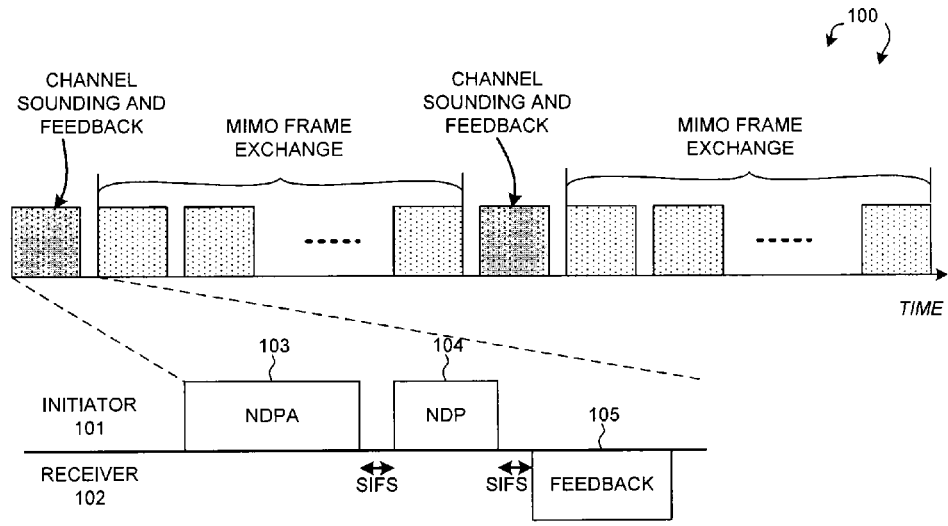
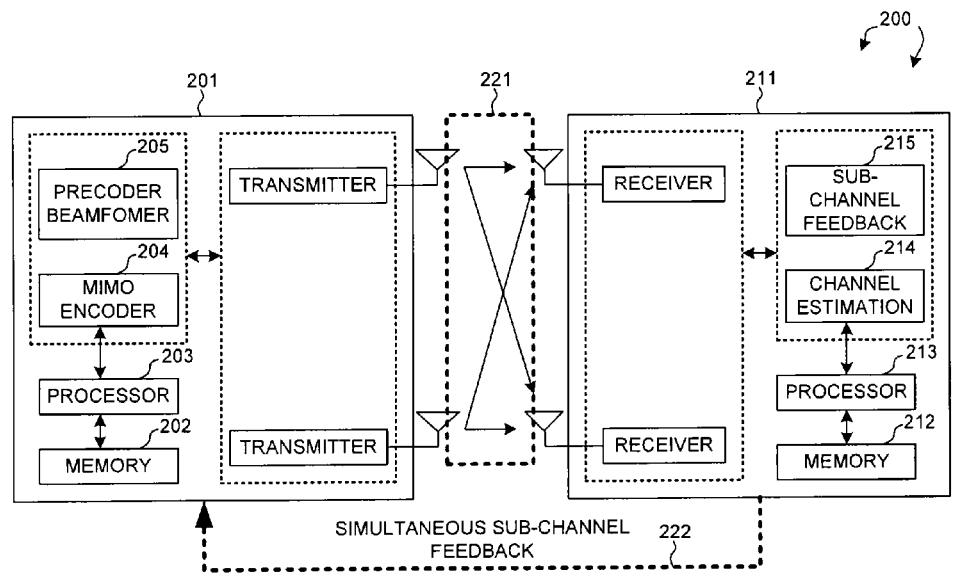
FIG. 2

SIMULTANEOUS FEEDBACK SIGNALING FOR DYNAMIC BANDWIDTH SELECTION

CROSS REFERENCE TO RELATED APPLICATIONS

This application is the 35 U.S.C. §371 national stage of, and claims priority to and the benefit of, PCT application PCT/US2011/057041, filed Oct. 20, 2011, which claims priority to and the benefit of U.S. Provisional Application No. 61/405,752, filed on Oct. 22, 2010, and U.S. Provisional Application No. 61/406,294, filed on Oct. 25, 2010, herein incorporated by reference in its entirety.

TECHNICAL FIELD

The disclosed embodiments relate generally to wireless network communications, and, more particularly, to sounding and feedback process in wireless communications systems.

BACKGROUND

The dynamic bandwidth transmission scheme has been adopted in the IEEE 802.11n standard to allow a transmitter of a 40 MHz BSS (basic service set) to transmit either 20 MHz or 40 MHz signal depending on clear channel assessment (CCA) sensing. For the upcoming IEEE 802.11ac standard, significant wider channel bandwidths (20 MHz, 40 MHz, 80 MHz, and 160 MHz) were proposed. The dynamic bandwidth transmission scheme in IEEE 802.11n is extended for the wider channel bandwidth in IEEE 802.11ac. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel (or full channel) is idle. This dynamic transmission bandwidth scheme allows system bandwidth resource to be efficiently utilized.

While the transmitter is making decision regarding the selection of the transmission sub-channel, other transmission parameters such as modulation and coding scheme (MCS), precoding, and transmit power might need to be changed based on the sub-channel conditions. For example, fast link adaptation can adapt MCS according to time varying channel conditions to increase throughput of a system. Fast link adaptation can be supported via a request and feedback process. Although the transmitting device does not have to depend on MCS feedback, it is widely adopted by the implementers. The transmitting device sends a MCS request and a sounding signal and the receiver sends the MCS feedback. Since different receiver implementations can have different receiver sensitivity levels, the receiver typically can make more accurate decision regarding the appropriate MCS to be used based on the channel conditions.

FIG. 1 (Prior Art) illustrates a conventional sounding and feedback process in a wireless system 10. Each channel sounding and feedback process is followed by a series of MIMO frame exchange. During channel sounding and feedback, a transmitting device (initiator 101) sends a sounding announcement (e.g., null data packet announcement (NDPA) 103,) followed by a sounding packet (e.g., null data packet (NPD) 104,) to a receiving device (responder 102) participating in the process. The responder estimates the channel during the preamble portion of the sounding packet. The responder then feedbacks the average SNR (signal-to-noise ratio) and CSI (channel state information) to allow the initiator to compute the transmit antenna (precoding) weights for MIMO transmission. Feedback packet 105 may also include other channel quality metrics such as BER, SNR/SINR, and mutual information. More specifically, the responder determines an appropriate MCS for the current channel and feedbacks the MCS to the initiator for fast link adaptation.

Feedback of accurate channel quality information such as SNR and MCS allows the transmitter to make correct decision regarding transmission bandwidth adjustment as well as MCS adaptation to improve system performance. In current implementation, channel quality information is provided based on a fixed sub-channel (e.g., the sounding bandwidth) and obtained through a sounding and feedback protocol. The channel conditions, however, could be significantly different in different sub-channels due to frequency selective fading. To have channel quality information for all valid sub-channels, multiple requests and feedbacks are required. This leads to increased system overhead.

Moreover, the transmission bandwidth adjustment is made at the transmitter using the CCA sensing immediately prior to transmission. In contrast, the channel sounding and feedback for transmit beamforming and MCS adaptation is a slow process. It is thus possible that the transmission bandwidth is regularly less than the sounding bandwidth. A solution is sought to allow dynamic transmission bandwidth and fast link adaptation to be executed more efficiently and accurately.

SUMMARY

A method of simultaneously providing channel quality feedback information in all valid sub-channels is provided to facilitate and improve the performance of dynamic transmission bandwidth adjustment and fast link adaptation. A receiving device receives a sounding signal over a wide channel in a wireless system. The sounding signal is transmitted from a transmitting device over multiple sub-channels of the wide channel. The receiving device estimates channel quality information based on the sounding signal for each sub-channel. The channel quality information includes estimated average SNR and recommended MCS and other channel quality metrics. The receiving device transmits a feedback message to the transmitting device. The feedback message contains the estimated channel quality information for all valid sub-channels within the transmission bandwidth. The transmitting device performs dynamic transmission bandwidth selection and fast link adaptation based on the channel quality information for all valid sub-channels.

The SNR/MCS channel quality information for all valid sub-channels may be carried in an extension MAC control header such as the HT control header. In one embodiment, if a sub-channel is interfered or its channel quality suffers significant degradation, then the feedback message may contain NULL SNR/MCS to indicate such degradation. In another embodiment, unsolicited SNR/MCS feedback may be provided by the receiver to the transmitter. For example, the receiving device may provide unsolicited feedback information to the transmitting device, and the feedback information includes only the valid sub-channels that do not suffer significant interference. To reduce system overhead, the feedback information may be carried via an NDP in the case that information is corrupted.

Other embodiments and advantages are described in the detailed description below. This summary does not purport to define the invention. The invention is defined by the claims.

BRIEF DESCRIPTION OF THE DRAWINGS

FIG. 1 (prior art) illustrates a conventional channel sounding and feedback process in a wireless system.

FIG. 2 illustrates a wireless system 200 with simultaneous sub-channel feedback in accordance with one novel aspect.

DETAILED DESCRIPTION

Figure 3:
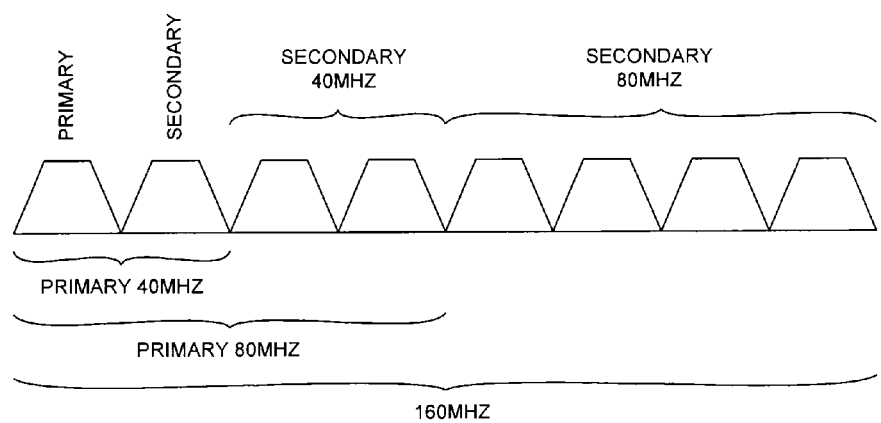
FIG. 3 illustrates examples of valid transmission sub-channels for a 160 MHz BSS in an IEEE 802.11ac wireless system.

Reference will now be made in detail to some embodiments of the invention, examples of which are illustrated in the accompanying drawings.

FIG. 2 illustrates a SU-MIMO wireless system 200 with simultaneous sub-channel feedback in accordance with one novel aspect. Wireless system 200 comprises a transmitting device 201 and a receiving device 211 communicating with each other via a MIMO channel 221. Transmitting device 201 comprises memory 202, a processor 203, a MIMO encoder 204, a beamformer/precoder 205, and a plurality of transmitters coupled to a plurality of antennas, respectively. Receiving device 211 comprises memory 212, a processor 213, a channel estimation module 214, a sub-channel feedback module 215, and a plurality of receivers coupled to a plurality of antennas, respectively. SU-MIMO channel 221 is formed by the plurality of transmitting antennas of transmitting station 201 and the plurality of receiving antennas of receiving station 211. Those skilled in the art would realize that "antenna" is used in a logical context, and may not necessarily be referred to as the physical antenna structure. SU-MIMO communication promises large gains for both channel capacity and reliability, essentially via the use of spatial-time codes and transmit beamforming (diversity gain oriented) combined with spatial stream multiplexed transmission (rate maximization oriented).

Channel sounding and feedback is a procedure to support transmit beamforming and fast link adaptation. At the transmitter side, transmitting device 201 transmits a sounding signal to receiving device 211. At the receiver side, receiving device 211 estimates the channel based on the received sounding signal. The receiving device 211 then feedbacks the average SNR (signal-to-noise ratio) and CSI (channel state information) to allow the transmitting device 201 to compute the transmit antenna beamforming weights for SU-MIMO transmission. The feedback information is transmitted via a feedback channel 222. The feedback information may include other channel quality metrics such as BER, SNR/SINR, and mutual information. Furthermore, the receiving device determines an appropriate MCS (modulation and coding scheme) for the current channel and feedbacks the estimated MCS to the transmitting device for fast link adaptation.

In IEEE 802.11n implementation, the feedback information is provided based on the current channel bandwidth. In one novel aspect, simultaneous feedback of channel quality information for all valid transmission bandwidths (e.g., all valid sub-channels) is proposed to facilitate and to improve the performance of dynamic bandwidth transmission scheme and fast link adaptation for IEEE 802.11ac systems.

Dynamic bandwidth transmission scheme has been adopted in the IEEE 802.11n standard, and is proposed to be extended for the wider bandwidth in the upcoming IEEE 802.11ac standard. For a basic service set (BSS) of certain bandwidth, a valid transmission sub-channel shall have bandwidth, allowable in the IEEE 802.11ac standard, equal or smaller than the full bandwidth of the BSS and contains the designated primary sub-channel of the BSS. Based on the CCA (clear channel assessment) sensing during PIFS (point coordination function (PCF) inter frame spacing (IFS)) duration prior to transmission, the transmitter is allowed to transmit in any of the valid transmission sub-channels, as long as the CCA indicates the selected sub-channel is idle. This dynamic transmission bandwidth scheme allows system bandwidth resource to be efficiently utilized.

FIG. 3 illustrates examples of valid transmission sub-channels for a 160 MHz BSS in an IEEE 802.11ac wireless system 300. In the example of FIG. 3, the BSS has a bandwidth of 160 MHz, consists of eight 20 MHz sub-channels. For the 160 MHz BSS, the valid transmission bandwidth can be 20 MHz, 40 MHz, 80 MHz, or 160 MHz, subject to certain rules of the channelization scheme in the IEEE 802.11ac standard and the capability of the device. The valid sub-channels for the 160 MHz BSS can be the 20 MHz primary sub-channel, the 40 MHz primary sub-channel, the 80 MHz primary sub-channel, or the full 160 MHz channel. Likewise, for a 80 MHz BSS, the valid sub-channels can be the 20 MHz primary sub-channel, the 40 MHz primary sub-channel, or the full 80 MHz channel. For a 40 MHz BSS, the valid sub-channels can be the 20 MHz primary sub-channel or the full 40 MHz channel, as defined in the IEEE 802.11n standard.

Under dynamic bandwidth transmission scheme, a transmitter is allowed to transmit in any of the valid transmission sub-channels, as long as the CCA indicates the selected sub-channel is idle. This dynamic bandwidth transmission scheme enhances the BSS performance in an OBSS (overlapping BSS) scenario. Such decision regarding the selection of sub-channels happens on the transmitter side immediately prior to transmission, with no prior signaling to the receiver. Feedback on accurate channel quality information such as accurate SNR/MCS information allows the transmitter to make correct decision regarding the transmission bandwidth as well as MCS adaptation to improve system performance.

In current IEEE 802.11n design, SNR/MCS feedback is provided for either 20 MHz or 40 MHz depending on the sounding packet. For example, if the sounding signal occupies 40 MHz, then the SNR/MCS feedback is provided for 40 MHz. The same SNR/MCS feedback is assumed valid for 20 MHz sub-channel. Such approach is not sufficient for IEEE 802.11ac where the transmission bandwidth can range from 160 MHz to 20 MHz. This is because the channel conditions could be significantly different in different sub-channels due to frequency selective fading. To have SNR/MCS information for all valid sub-channels, multiple requests and feedbacks are required. This leads to increased system overhead.

Moreover, the transmission bandwidth adjustment is made at the transmitter using the CCA sensing immediately prior to transmission. In contrast, the channel sounding and feedback for transmit beamforming and MCS adaptation is a slow process. It is thus possible that the transmission bandwidth is regularly less than the sounding bandwidth. As a result, fast link adaptation would not be possible with dynamic bandwidth selection if inaccurate and unreliable SNR/MCS feedback is provided for the valid transmission sub-channels.

Figure 4:
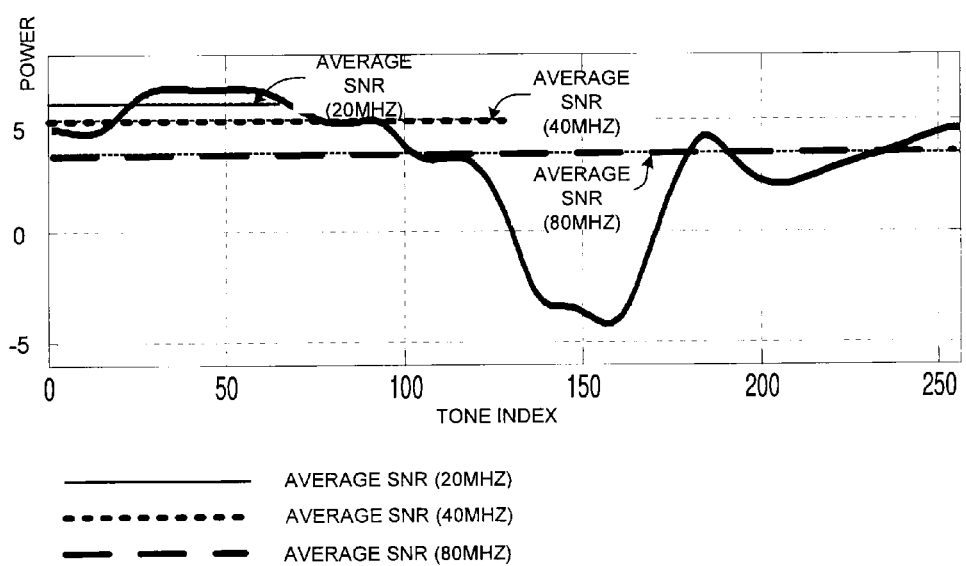
FIG. 4 illustrates a simulation result of relative radio signal power across an 80 MHz channel.

FIG. 4 illustrates a simulation result of relative radio signal power across a 80 MHz channel. In the example of FIG. 4, the 80 MHz channel consists of approximately 250 frequency tones (e.g., subcarriers in OFDM) as indicated by the horizontal axis, and the vertical axis indicates the radio signal power across the entire bandwidth. It can be seen that the radio signal power varies significantly across the 80 MHZ channel, and thus the average SNR for different sub-channels varies significantly. For example, the average SNR for the first 20 MHz sub-channel (e.g., depicted by a solid line) is the higher than 5 dB, the average SNR for the first 40 MHz sub-channel (e.g., depicted by a dotted line) is around 5 dB, and the average SNR for the entire 80 MHz channel (e.g., depicted by a dashed line) is much lower than 5 dB. Therefore, it would be inaccurate to use the average SNR of the 80 MHz channel to represent a smaller 20 MHZ or 40 MHZ sub-channel.

Figure 5A:
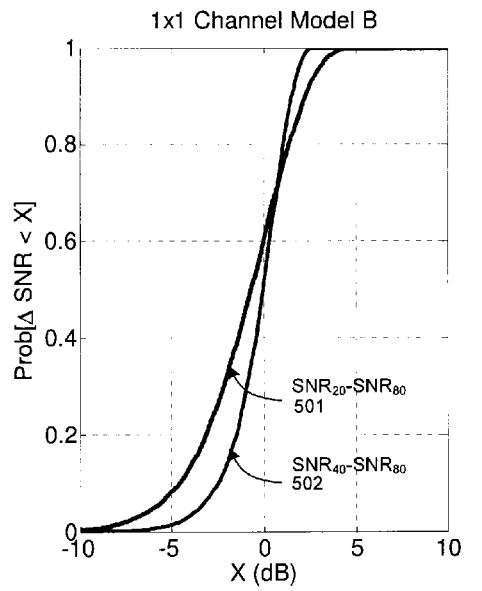
FIGS. 5A and 5B illustrate the probability of differences in average SNR across different channels.
Figure 5B:
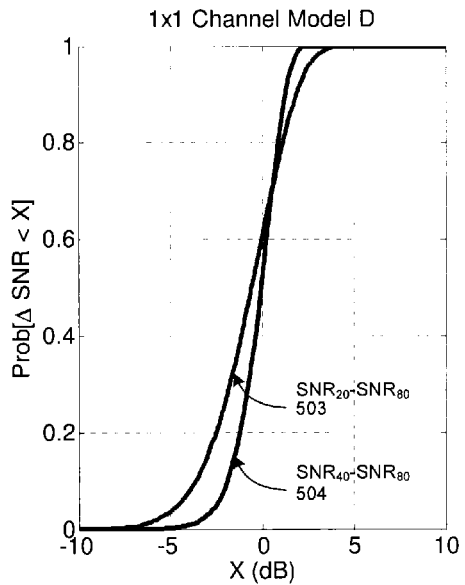

FIGS. 5A and 5B illustrate the probability of differences in average SNR across different channels. The horizontal axis indicates the SNR difference, while the vertical axis indicates the probability of such SNR difference across different channels for different channel models. In FIG. 5A, line 501 indicates the probability of average SNR difference between a 20 MHz channel and a 80 MHz channel for channel model B, while line 502 indicates the probability of average SNR difference between a 40 MHz channel and a 80 MHz channel for channel model B. Similarly, in FIG. 5B, line 503 indicates the probability of average SNR difference between a 20 MHz channel and a 80 MHz channel for channel model D, while line 504 indicates the probability of average SNR difference between a 40 MHz channel and a 80 MHz channel for channel model D. It can be seen that for channel model B, the probability that the average SNR values across the 80 MHz and 20 MHz vary more than 2 dB is greater than 45%. Similarly, for channel model D, the probability that the average SNR values across the 80 MHz and 20 MHz vary more than 2 dB is greater than 35%. Therefore, the SNR value for a 20 MHz or 40 MHz sub-channel cannot be estimated reliably from the SNR value for an 80 MHz channel. The same result is also applicable to MCS. Consequently, fast link adaptation would not be possible with dynamic bandwidth selection.

Based on the above observation, simultaneous feedback of channel quality information for all valid transmission bandwidths (e.g., all valid sub-channels) is proposed to facilitate and to improve the performance of dynamic bandwidth transmission scheme and fast link adaptation for IEEE 802.11ac systems. Channel quality information is provided via a request and feedback mechanism. The transmitting device sends an SNR/MCS request and a sounding signal and the receiving device sends the SNR/MCS feedback. The SNR/MCS request may be carried via a data frame or an action frame. In one specific embodiment, a channel sounding and feedback procedure is used to provide channel estimation and channel quality information.

Figure 6:
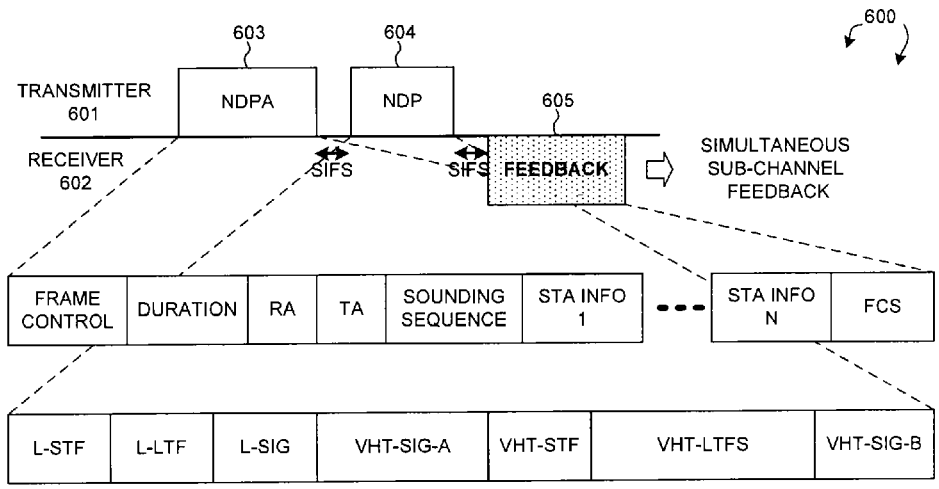
FIG. 6 illustrates a channel sounding and feedback procedure in wireless system in accordance with one novel aspect.

FIG. 6 illustrates a channel sounding and feedback procedure in wireless system 600 in accordance with one novel aspect. Wireless system 600 comprises a transmitting device 601 and a receiving device 602. During the channel sounding and feedback process, transmitting device 601 sends a sounding announcement (e.g., null data packet announcement (NDPA) 603) followed by a sounding packet (e.g., null data packet (NPD) 604,) to receiving device 602. NPDA 603 is transmitted first to inform the intended receiving device (e.g., via STA INFO fields) and NDP 604 is then transmitted for the intended receiving device to estimate the channel. In NPD 604, the L-STF, L-LTF, L-SIG fields are used for setting up the protection field against legacy devices. The signaling information for the NDP signal is carrier in the VHT-SIG-A and the channel estimation is performed on the LTFs (long training fields). The wideband VHT signal uses duplicate signal format that replicates the 20 MHz waveform in each of the 20 MHz sub-channels that is being used. Receiving device 602 then transmits a feedback packet 605 back to transmitting device 601. The feedback information includes channel quality information such as the average SNR, the estimated MCS, and possibly other channel quality metrics such as BER or mutual information.

In one novel aspect, to facilitate and to improve the performance of the dynamic transmission bandwidth adjustment and fast link adaptation, receiving device 602 provides simultaneous SNR/MCS information contained in the same feedback message 605 for all valid transmission sub-channels. For example, if 40 MHz sounding is used for 40 MHz channel, then the feedback message contains SNR/MCS values for the 40 MHz channel and a 20 MHz primary sub-channel. If 80 MHZ sounding is used for 80 MHz channel, then the feedback message contains SNR/MCS values for the 80 MHz channel, a 40 MHz primary sub-channel, and a 20 MHz primary sub-channel. If 160 MHZ sounding is used for 160 MHz channel, then the feedback message contains SNR/MCS values for the 160 MHZ channel, an 80 MHz primary sub-channel, a 40 MHz primary sub-channel, and a 20 MHz primary sub-channel. By providing SNR/MCS information for all valid sub-channels in one sounding and feedback process, lower system overhead is achieved with reduced number of request and feedback. The simultaneous sub-channel feedback scheme provides accurate SNR/MCS information for all valid sub-channels and allows dynamic transmission bandwidth scheme and fast link adaptation to be executed more efficiently and more accurately.

Figure 7:
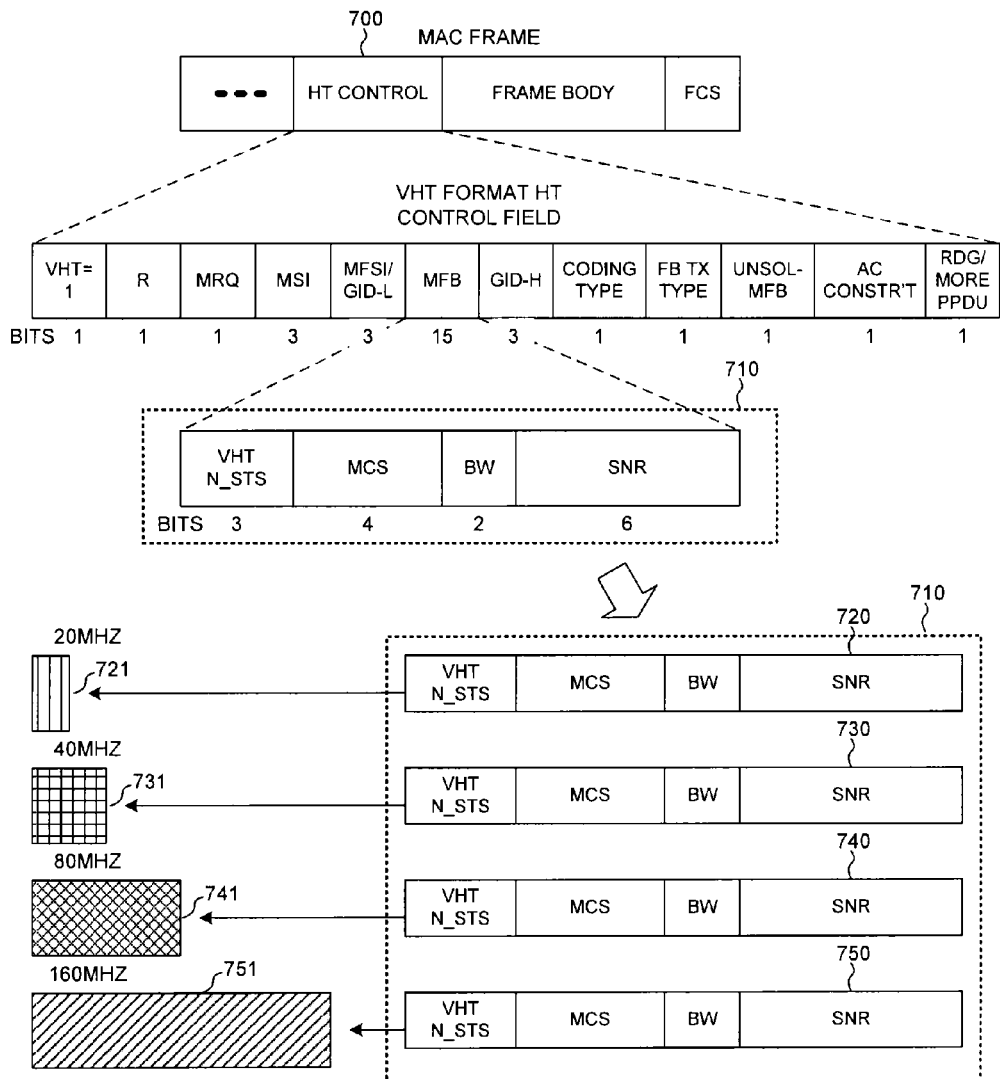
FIG. 7 illustrates a novel feedback frame format in an IEEE 802.11ac wireless system.

FIG. 7 illustrates a feedback frame format in an IEEE 802.11ac wireless system. In the example of FIG. 7, a MAC frame 700 contains a HT (high throughput) control field, which further contains an MCS request (MRQ) subfield, an MCS sequence identifier (MSI) subfield, an MFB sequence identifier/LSB of Group ID (MFSI/GID-L) subfield, a VHT N_STS, MCS, BW and SNR feedback (MFB) subfield, an MSB of Group ID (GID-H) subfield, coding type of MFB response (Coding Type) subfield, transmission type of MFB response (FB Tx Type) subfield, unsolicited MFB subfield, AC constraint subfield, and RDG/More PPDU subfield. The MFB subfield further contains a number of spatial streams (N_STS) subfield, an MCS subfield, a bandwidth (BW) subfield, and an SNR subfield. When the MRQ subfield is set to one, MFB is then requested (solicited MFB), and the MSI subfield contains a sequence number in the range from zero to six that identifies the specific request. If the unsolicited MFB subfield is set to one, then MFSI/GID-L subfield contains the lowest three bits of Group ID of the PPDU to which the unsolicited MFB refers, and the GID-H subfield contains the highest three bits of Group ID of the PPDU to which the unsolicited MFB refers. When MFB is requested, the MFB subfield contains the number of spatial streams, modulation and coding scheme, data transmission rate, bandwidth, and SNR information.

In the example of FIG. 7, the receiving device provides the MFB subfield feedback information for every valid sub-channel of a 160 MHz channel. When a 160 MHZ sounding is used for the 160 MHz channel, the MFB subfield 710 contains multiple MFB subfields, and each MFB subfield corresponds to a valid sub-channel. For example, MFB subfield 720 contains feedback information for the primary 20 MHZ sub-channel 721, MFB subfield 730 contains feedback information for the primary 40 MHz sub-channel 731, MFB subfield 740 contains feedback information for the primary 80 MHz sub-channel 741, and MFB subfield 750 contains feedback information for the full 160 MHz channel 751. Each MFB subfield contains N_STS/MCS/BW/SNR information for the corresponding sub-channel. For the MCS subfield, the IEEE 802.11 standard defines up to 76 modulation and coding schemes with over 45 data transmission rate. In one example, estimated SNR is used to perform an effective link adaptation based on the network condition and channel quality. Link adaptation based on SNR is a PHY-aware MAC implementation that allows the MAC layer to select a PHY data rate based on estimated SNR and desired packet error rate. The MCS subfield comprises modulation type, channel-coding type, channel-coding rate, spatial rank, and transmission diversity type.

In support of the dynamic selection of the transmission sub-channel, the estimated SNR and recommended MCS and other channel quality metrics for all the valid sub-channels are available to the transmitter to aid the selection. With accurate selection, the associated link performance can be improved substantially. When the channel quality metrics are available a priori, dynamic selection of the transmission sub-channel can be executed immediately.

In one embodiment, if a sub-channel is interfered or its channel quality suffers significant degradation, then the feedback message may contain NULL SNR/MCS to indicate such degradation. For example, a value of MCS=15 and VHT N_STS=7 indicates that no feedback is present for a corresponding sub-channel. In another embodiment, unsolicited SNR/MCS feedback may be provided by the receiver to the transmitter. For example, the receiving device may provide unsolicited feedback information to the transmitting device, and the feedback information includes only the valid sub-channels that do not suffer significant interference. To reduce system overhead, the feedback information may be carried via an NDP in the case that information is corrupted.

Figure 8:
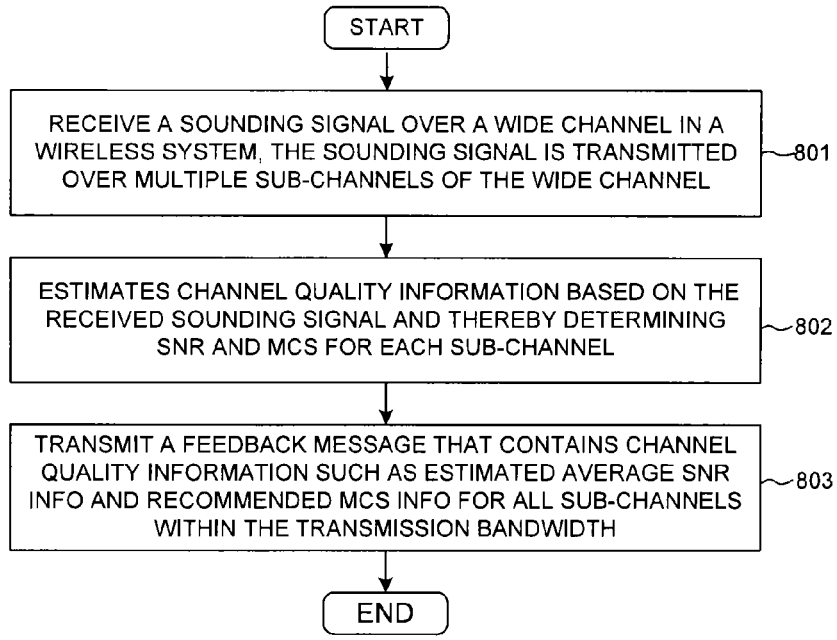
FIG. 8 is a flow chart of a method of transmitting simultaneous SNR/MCS feedback for all valid sub-channels in a wireless communication system.

FIG. 8 is a flow chart of a method of transmitting simultaneous SNR/MCS feedback for all valid sub-channels in a wireless communication system. In step 801, a receiving device receives a sounding signal over a wide channel in a wireless system. The sounding signal is transmitted from a transmitting device over multiple sub-channels of the wide channel. In step 802, the receiving device estimates channel quality information based on the sounding signal for each sub-channel. The channel quality information includes estimated average SNR and recommended MCS and other channel quality metrics. In step 803, the receiving device transmits a feedback message to the transmitting device. The feedback message contains the estimated channel quality information for all valid sub-channels within the transmission bandwidth.

Figure 9:
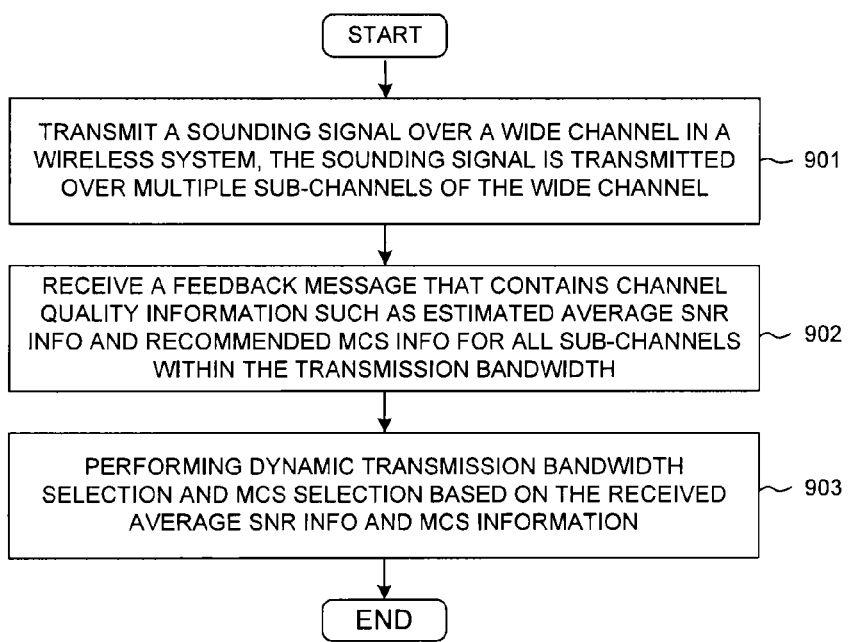
FIG. 9 is a flow chart of a method of receiving simultaneous SNR/MCS feedback for all valid sub-channels in a wireless communication system.

FIG. 9 is a flow chart of a method of receiving simultaneous SNR/MCS feedback for all valid sub-channels in a wireless communication system. In step 901, a transmitting device transmits a sounding signal over a wide channel in a wireless system. The sounding signal is transmitted to a receiving device over multiple sub-channels of the wide channel. In step 902, the transmitting device receives a feedback message from the receiving device. The feedback message contains channel quality information such as estimated average SNR and recommended MCS for all valid sub-channels within the transmission bandwidth. In step 903, the transmitting device performs dynamic transmission bandwidth selection and fast link adaptation based on the channel quality information for all valid sub-channels.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
   (a) receiving a sounding signal transmitted from a transmitting device over a wide channel by a receiving device in a wireless system, wherein the sounding signal is transmitted over multiple sub-channels of the wide channel;
   (b) estimating channel quality information based on the received sounding signal for each sub-channel; and
   (c) transmitting a feedback message to the transmitting device, wherein the feedback message contains the estimated channel quality information for all valid transmission bandwidths within a transmission bandwidth of the wide channel, and the feedback message is provided to the transmitting device for performing dynamic transmission bandwidth selection and/or MCS adaptation;
   wherein the feedback message contains a HT control field, which contains multiple MFB subfields, and each MFB subfield corresponds to one of the valid sub-channels.

2. The method of claim 1, wherein the channel quality information comprises average signal to noise ratio (SNR) for each sub-channel.

3. The method of claim 1, wherein the channel quality information comprises recommended modulation and code scheme (MCS) for each sub-channel.

4. The method of claim 1, wherein the receiving device is capable of simultaneously estimating SNR and MCS for all sub-channels within the transmission bandwidth.

5. The method of claim 1, wherein the receiving device indicates interference of a sub-channel by reporting a NULL SNR/MCS for the sub-channel.

6. A device, comprising:
   a receiver that receives a sounding signal transmitted from a transmitting device over a wide channel in a wireless system, wherein the sounding signal is transmitted over multiple sub-channels of the wide channel;
   a channel estimation module that estimates channel quality information based on the received sounding signal for each sub-channel; and
   a transmitter that transmits a feedback message to the transmitting device, wherein the feedback message contains the estimated channel quality information for all valid transmission bandwidths within a transmission bandwidth of the wide channel;
   wherein the feedback message is provided to the transmitting device for performing dynamic transmission bandwidth selection and/or MCS adaptation;
   wherein the feedback message contains a HT control field, which contains multiple MFB subfields, and each MFB subfield corresponds to one of the valid sub-channels.

7. The device of claim 6, wherein the channel quality information comprises average signal to noise ratio (SNR) for each sub-channel.

8. The device of claim 6, wherein the channel quality information comprises modulation and code scheme (MCS) recommendation for each sub-channel.

9. The device of claim 6, wherein the device is capable of simultaneously estimating average SNR and MCS for all sub-channels within the transmission bandwidth.

10. The device of claim 6, wherein the device indicates interference of a sub-channel by reporting a NULL SNR/MCS for the sub-channel.

11. The device of claim 6, wherein the wireless system is an IEEE 802.11ac system.

12. A method, comprising:
(a) transmitting a sounding signal by a transmitting device to a receiving device over a wide channel in a wireless system, wherein the sounding signal is transmitted over multiple sub-channels of the wide channel; and
(b) receiving a feedback message from the receiving device, wherein the feedback message contains channel quality information for all valid transmission bandwidths within a transmission bandwidth of the wide channel;
wherein the feedback message is provided to the transmitting device for performing dynamic transmission bandwidth selection and/or MCS adaptation;
wherein the feedback message contains a HT control field, which contains multiple MFB subfields, and each MFB subfield corresponds to one of the valid sub-channels.

13. The method of claim 12, wherein the channel quality information comprises average signal to noise ratio (SNR) for each sub-channel.

14. The method of claim 12, wherein the channel quality information comprises a recommended modulation and coding scheme (MCS) for each sub-channel.

15. A device, comprising:
a transmitter that transmits a sounding signal to a receiving device over a wide channel in a wireless system, wherein the sounding signal is transmitted over multiple sub-channels of the wide channel; and
a receiver that receives a feedback message from the receiving device, wherein the feedback message contains channel quality information for all valid transmission bandwidths within a transmission bandwidth of the wide channel; wherein the feedback message is provided to the device for performing dynamic transmission bandwidth selection and/or MCS adaptation;
wherein the feedback message contains a HT control field, which contains multiple MFB subfields, and each MFB subfield corresponds to one of the valid sub-channels.

16. The device of claim 15, wherein the channel quality information comprises average signal to noise ratio (SNR) for each sub-channel.

17. The device of claim 15, wherein the channel quality information comprises a recommended modulation and coding scheme (MCS) for each sub-channel.

18. The device of claim 15, wherein the wireless system is an IEEE 802.11ac system.

* * * * *